United States Patent
Chiu et al.

(10) Patent No.: US 8,378,973 B2
(45) Date of Patent: *Feb. 19, 2013

(54) METHOD FOR SCROLL BAR CONTROL ON A TOUCHPAD

(75) Inventors: Yen-Chang Chiu, Taipei County (TW); Yung-Lieh Chien, Taoyuan County (TW); Zhi-Long Wu, Taipei County (TW)

(73) Assignees: Elan Microelectronics Corporation, Hsinchu (TW); Elan Tech Devices Corporation, Taipei County (TW)

( * ) Notice: Subject to any disclaimer, the term of this patent is extended or adjusted under 35 U.S.C. 154(b) by 1206 days.

This patent is subject to a terminal disclaimer.

(21) Appl. No.: 11/171,430

(22) Filed: Jul. 1, 2005

(65) Prior Publication Data
US 2006/0001652 A1    Jan. 5, 2006

(30) Foreign Application Priority Data
Jul. 5, 2004 (TW) ............................... 93120151 A

(51) Int. Cl.
*G06F 3/041*    (2006.01)

(52) U.S. Cl. ..................................... 345/173; 178/18.01
(58) Field of Classification Search .......... 345/173–178; 178/18.01–19.07
See application file for complete search history.

(56) References Cited

U.S. PATENT DOCUMENTS

| | | | |
|---|---|---|---|
| 5,825,352 A * | 10/1998 | Bisset et al. .................. | 345/173 |
| 6,690,365 B2 * | 2/2004 | Hinckley et al. .............. | 345/173 |
| 2002/0015024 A1 * | 2/2002 | Westerman et al. .......... | 345/173 |
| 2002/0063688 A1 * | 5/2002 | Shaw et al. ................... | 345/163 |
| 2006/0026521 A1 * | 2/2006 | Hotelling et al. ............. | 715/702 |

* cited by examiner

*Primary Examiner* — Michael Pervan
(74) *Attorney, Agent, or Firm* — Rosenberg, Klein & Lee

(57) ABSTRACT

In a method for scroll bar control on a touchpad, the fingers touching on the touchpad are detected to start up and terminate a scroll bar control function. In the scroll bar control function, the movement of the finger or fingers touching on the touchpad is detected for scrolling on a window, and the vertical distance and the horizontal distance of the movement are evaluated for determining the scrolling amount of a vertical scroll bar or a horizontal scroll bar of the window.

18 Claims, 5 Drawing Sheets

METHOD FOR SCROLL BAR CONTROL ON A TOUCHPAD

FIELD OF THE INVENTION

The present invention is related generally to a scroll bar operating method and particularly to a method for scroll bar control on a touchpad.

BACKGROUND OF THE INVENTION

Recently, due to the advantages of simple, light and low cost, the touchpad has been widely applied in various electronic products to replace the conventional input devices, for example the computer mouse. A method and apparatus for scroll bar control is proposed by U.S. Pat. No. 5,943,052 to Allen et al., to define scroll regions on a touchpad for scrolling the scroll bars of a window. Specifically, as shown in FIG. 1, on a touchpad 10 there are a block 12 to be defined for cursor control region, a block 14 to be defined for vertical scroll region, and a block 16 to be defined for horizontal scroll region. When a user is to move a cursor, he needs to put his finger in the cursor control region 12 first, and then to move his finger in the cursor control region 12 to control the movement of the cursor. When a user is to scroll a window in the vertical direction, he is requested to put his finger in the vertical scroll region 14 first, and then to vertically move his finger in the vertical scroll region 12 to control the vertical scroll bar of the window. Similarly, to scroll a window in the horizontal direction, a user is requested to put his finger in the horizontal scroll region 16 first and then to horizontally move his finger in the horizontal scroll region 16. However, defining the vertical scroll region 14 and the horizontal scroll region 16 will reduce the area of the cursor control region 12, and therefore have the operations in the cursor control region 12 more difficult. Moreover, the vertical scroll region 14 and the horizontal scroll region 16 cannot be enabled to use at a same time. Further, each time to switch between the cursor control function and the scroll bar control functions, for example from the cursor control function to the vertical scroll bar control function or from the vertical scroll bar control function to the horizontal scroll bar control function, the user is necessary to have his finger leaving the touchpad 10 from the current region first and then touching on the touchpad 10 in another region again, to terminate the current control function and to start up the next control function. For example, slipping the finger on the touchpad 10 from the cursor control region 12 to either the vertical scroll region 14 or the horizontal scroll region 16 will not enable any scroll bar control functions. More disadvantageously, to avoid the finger to put in a wrong region when switching between difference control functions, the user needs to move his eyes from the monitor to the touchpad 10 to ensure the position where his finger is touching on again and again.

On the other hand, a method is proposed by U.S. Pat. No. 5,825,352 to Bisset et al., by sensing the number of fingers landing on a touchpad to emulate mouse buttons and mouse operations. However, this art cannot provide any scroll bar control functions by operating on a touchpad.

Therefore, it is desired a method using multiple fingers for scroll bar control on a touchpad.

SUMMARY OF THE INVENTION

One object of the present invention is to provide a method for scroll bar control on a touchpad.

In a method for scroll bar control on a touchpad, according to the present invention, the fingers touching on the touchpad are detected, and if the number of the fingers is equal to or more than a first threshold, a scroll bar control function starts up. In the scroll bar control function, the movement of the finger or fingers touching on the touchpad is detected, and the vertical distance and the horizontal distance of the movement are evaluated for determining the scrolling amount of a vertical scroll bar or a horizontal scroll bar of a window. Moving the fingers to leave the number of the fingers touching on the touchpad less than a second threshold will terminate the scroll bar control function.

Alternatively, the difference between the vertical distance and the horizontal distance is evaluated to determine the scrolling amount of the vertical scroll bar or the horizontal scroll bar. If the vertical distance is larger than the horizontal distance over a reference, the vertical scroll bar of the window is scrolled by a scrolling amount proportional to the difference. If the horizontal distance is larger than the vertical distance over the reference, the horizontal scroll bar of the window is scrolled by a scrolling amount proportional to the difference.

Alternatively, if the vertical distance is larger than the horizontal distance over a reference, the vertical scroll bar of the window is scrolled by a scrolling amount proportional to the vertical distance, and if the horizontal distance is larger than the vertical distance over the reference, the horizontal scroll bar of the window is scrolled by a scrolling amount proportional to the horizontal distance.

Preferably, once the scroll bar control function starts up, the method according to the present invention allows a user to leave only a finger slipping on the touchpad to scroll a vertical or horizontal scroll bar.

By detecting the number of fingers touching on the touchpad to switch between different control functions, the method according to the present invention does not need to define vertical and horizontal scroll regions on a touchpad, and does not request the user to move his eyes to the touchpad all the time in use. Moreover, the vertical and horizontal scroll bars may be simultaneously operated by only a movement of finger or fingers on a touchpad.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 2:
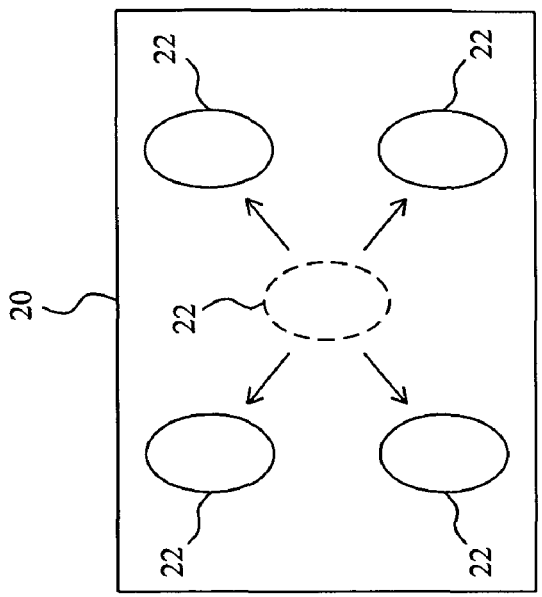
FIG. 2 shows a touchpad serving as an input device communicated with a host system according to the present invention.
Figure 1:
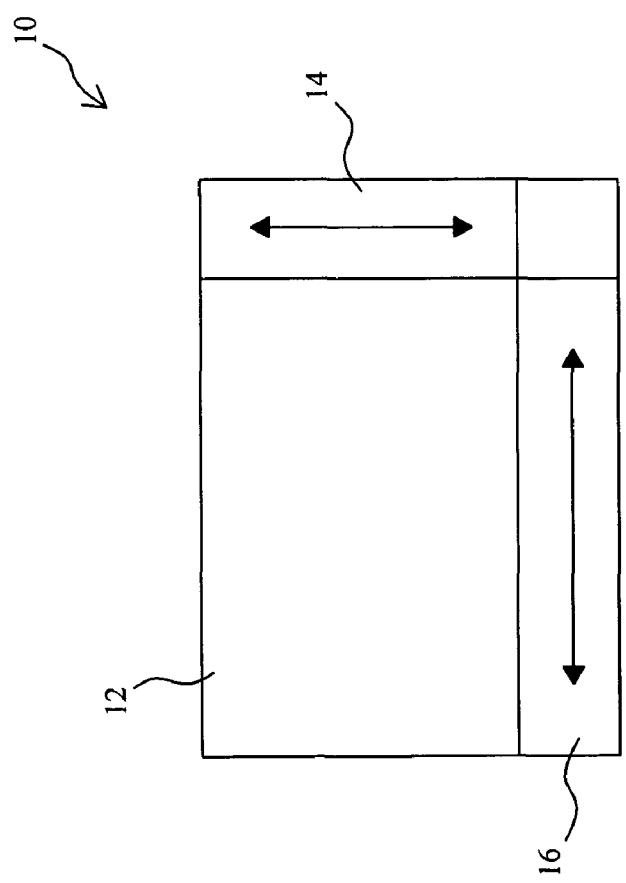
FIG. 1 shows a conventional touchpad serving as a computer mouse.
Figure 3:
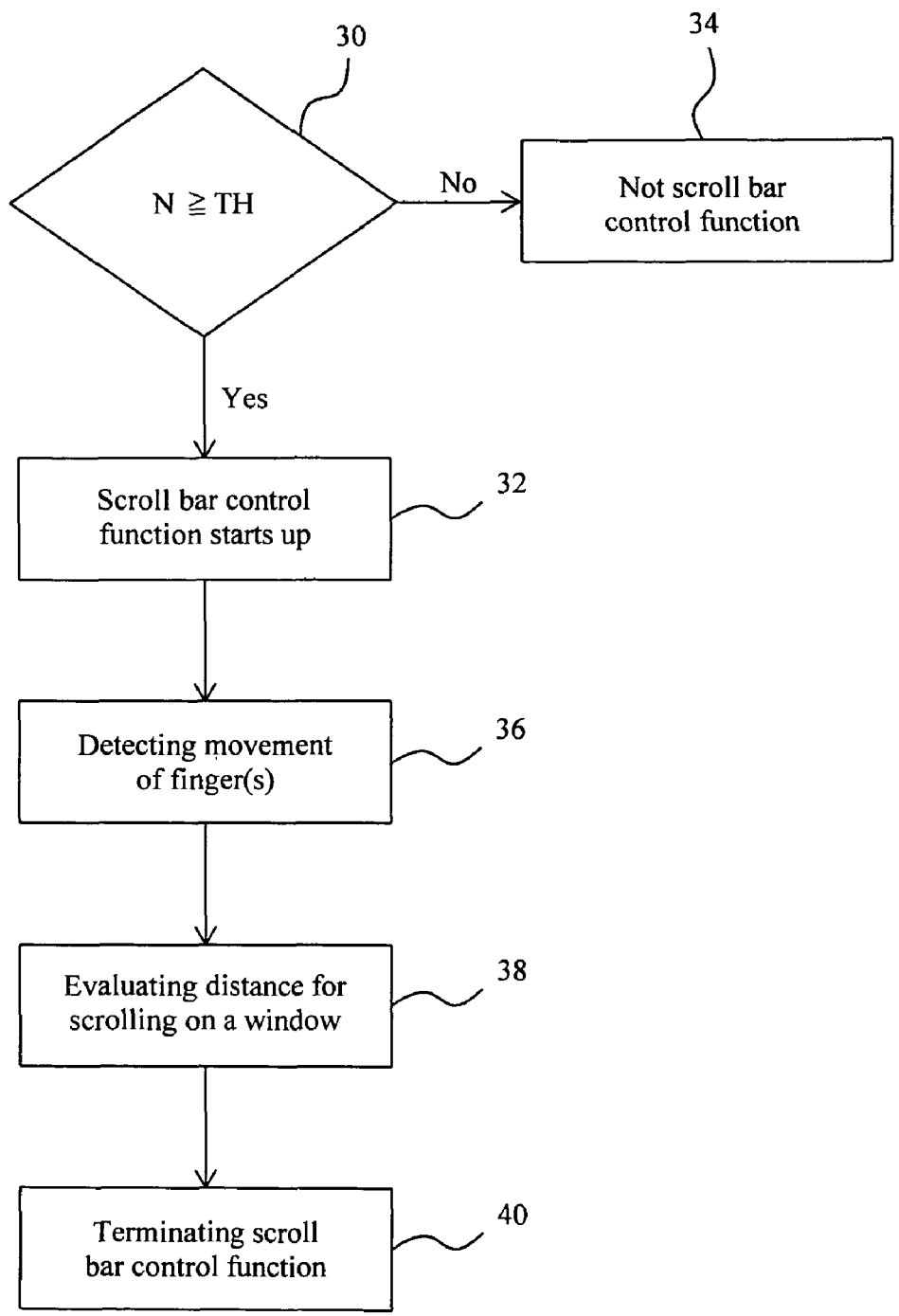
FIG. 3 shows a flowchart of a method for scroll bar control on the touchpad of FIG. 2 according to the present invention.
Figure 5:
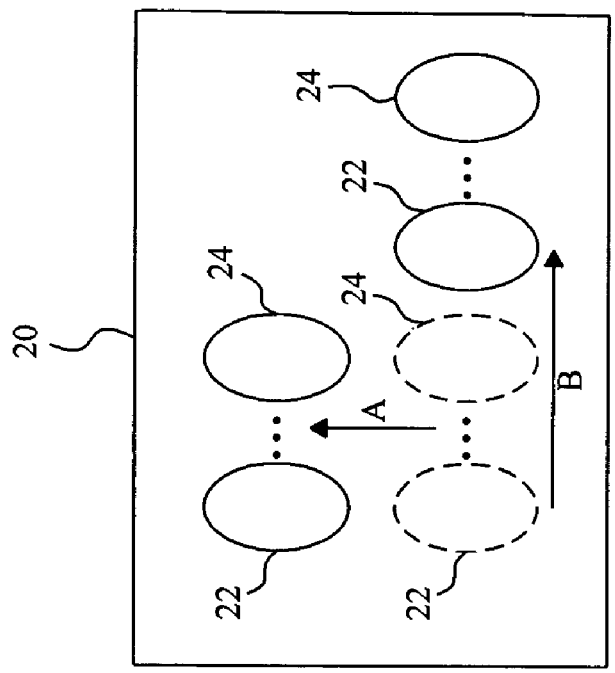
FIG. 5 is a diagram of slipping the fingers on the touchpad of FIG. 2 upward and rightward to scroll on a window.
Figure 4:
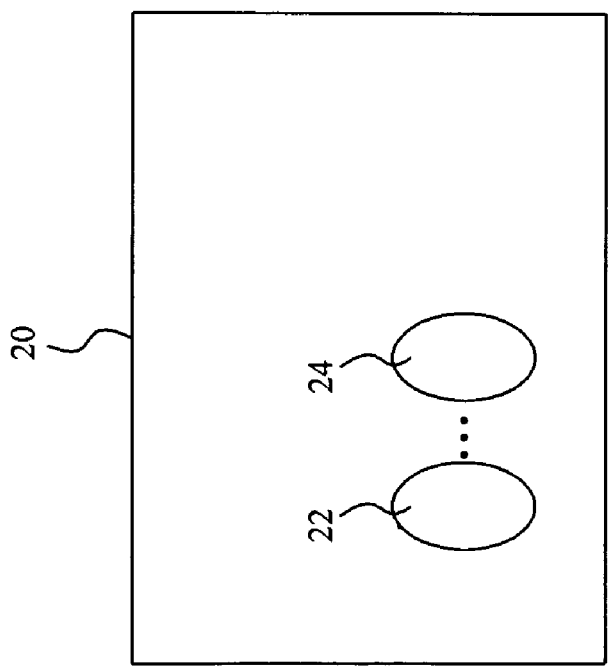
FIG. 4 shows several fingers touching on the touchpad of FIG. 2 to start up a scroll bar control function.

FIG. 2 shows a touchpad 20 serving as an input device communicated with a host system according to the present invention, on which a finger 22 is slipping in arbitrary directions for cursor movement control on a window of an application running on the host system. FIG. 3 shows a flowchart of a method for scroll bar control on the touchpad 20 according to the present invention. In step 30, it is detected if the fingers (number N) touching on the touchpad 20 is equal to or more than a threshold TH for example two, and if it is (N≧TH), go to step 32 for a start-up of a scroll bar control function, otherwise go to step 34 for other or no operations. When a user desires for scroll bar control on the touchpad 20, the only thing to do is to put his one or more other fingers 24 on the touchpad 20, as shown in FIG. 4, such that the fingers 22-24 touching on the touchpad 20 are equal to or more than the predetermined threshold TH. Once the fingers 22-24 touching on the touchpad 20 are detected equal to or more than the threshold TH, the touchpad 20 is switched from the cursor control function to the scroll bar control function. After switching to the scroll bar control function, as shown in FIG. 5, it is detected the movement of the fingers 22-24 on the touchpad 20 in step 36. When the fingers 22-24 slipping on the touchpad 20, the distance of the movement will be evaluated in step 38, for example a distance A of an upward movement or a distance B of a rightward movement, as shown in FIG. 5, and then a signal is generated to send to the host system for scrolling on the window, in which the scrolling amounts of the vertical and horizontal scroll bars of the window are determined with the distances A and B respectively, preferably in a proportional manner. In addition to moving in the vertical and horizontal directions as shown in FIG. 5, the fingers 22-24 may be slipping on the touchpad 20 in an arbitrary direction $\vec{a}$, as shown in FIG. 6, and the scrolling direction and the scrolling amount of the window may be determined by various schemes, for example illustrated by three embodiments in the following:

First Embodiment of Scroll Bar Control

Figure 6:
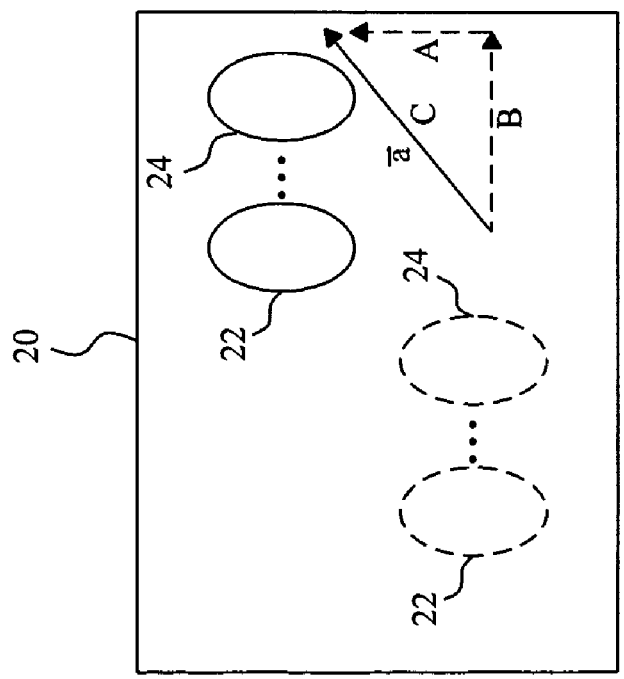
FIG. 6 is a diagram of slipping the fingers on the touchpad of FIG. 2 in an arbitrary direction to scroll on a window.

Referring to FIG. 6, the vertical component A and the horizontal component B of the distance C of the movement in the direction $\vec{a}$ are first evaluated, and in the signal sent to the host system for scroll bar control, the vertical and horizontal scroll bars of the window are scrolled simultaneously, with a vertical scrolling amount proportional to the distance A and a horizontal scrolling amount proportional to the distance B.

Second Embodiment of Scroll Bar Control

Referring to FIG. 6, the vertical component A and the horizontal component B of the distance C of the movement in the direction $\vec{a}$ are first evaluated, and the difference D between the distances A and B are further evaluated. If the vertical distance A is larger than the horizontal distance B over a reference R, i.e., D=(A−B)>R, then the vertical scroll bar of the window is scrolled, and the scrolling amount of the vertical scroll bar is proportional to the difference D. On the contrary, if the horizontal distance B is larger than the vertical distance A over the reference R, i.e., D=(B−A)>R, then the horizontal scroll bar of the window is scrolled, and the scrolling amount of the horizontal scroll bar is proportional to the difference D.

Third Embodiment of Scroll Bar Control

Referring to FIG. 6, the vertical component A and the horizontal component B of the distance C of the movement in the direction $\vec{a}$ are first evaluated, and the distances A and B are compared to each other. If the vertical distance A is larger than the horizontal distance B over a reference R, i.e., (A−B)>R, then the vertical scroll bar of the window is scrolled by a scrolling amount proportional to the vertical distance A. On the contrary, if the horizontal distance B is larger than the vertical distance A over the reference R, i.e., (B−A)>R, then the horizontal scroll bar of the window is scrolled by a scrolling amount proportional to the horizontal distance B.

Figure 7:
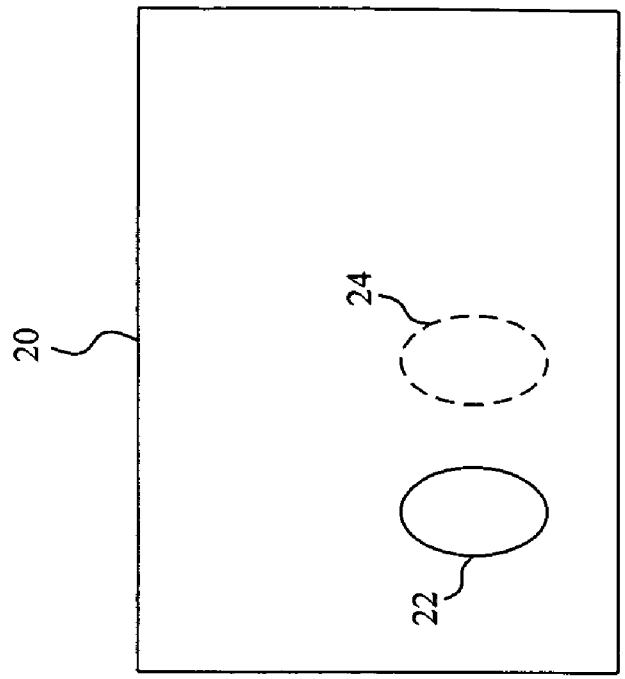
FIG. 7 is a diagram of leaving only a finger touching on the touchpad of FIG. 2 to scroll on a window.
Figure 8:
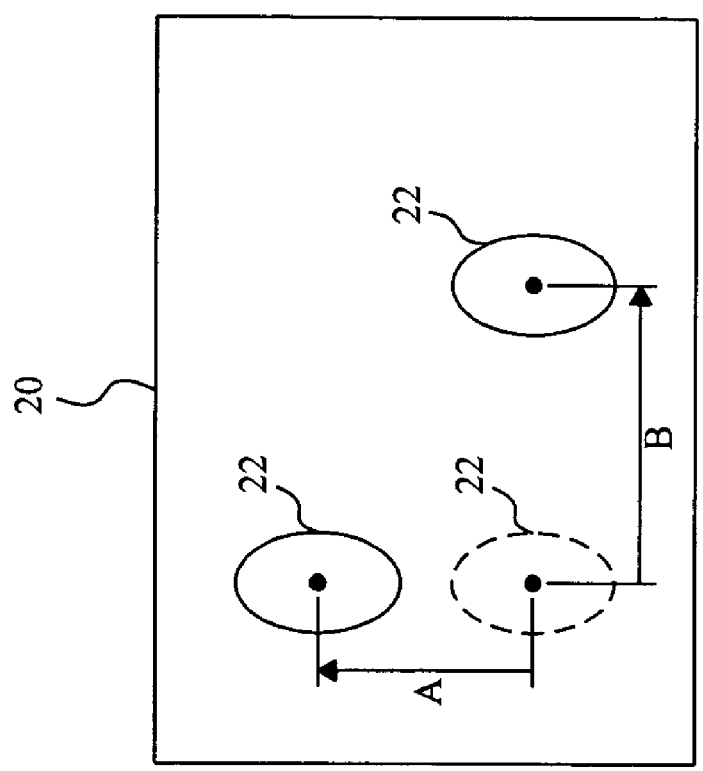
FIG. 8 is a diagram of slipping a finger on the touchpad of FIG. 2 for scrolling on a window.

Referring back to FIG. 3, in step 40, the scroll bar control function will be terminated if the fingers touching on the touchpad 20 are equal to or less than a threshold for example zero. In the case of a zero threshold, all the fingers 22-24 leaving the touchpad 20 will terminate the scroll bar control function. After terminating the scroll bar control function, if a finger 22 is touching on the touchpad 20 again, the touchpad 20 will be switched to the cursor control function, while if several fingers 22-24 equal to or more than the threshold TH are touching on the touchpad 20 again, the touchpad 20 will be switched back to the scroll bar control function as illustrated in FIG. 3. In another embodiment, after the start-up of a scroll bar control function by several fingers 22-24 touching on the touchpad 20 as shown in FIG. 4, the finger or fingers 24 may be removed from the touchpad 20 for leaving only the finger 22 still touching on the touchpad 20 as shown in FIG. 7, and then slipping the finger 22 on the touchpad 20 for scrolling on a window as shown in FIG. 8.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set fourth in the appended claims.

What is claimed is:

1. A method for scroll bar control on a touchpad, comprising the steps of:
    detecting if a number of fingers touching on the touchpad is equal to or larger than a first threshold, for starting up a scroll bar control function;
    selectively redefining the touchpad in operational configuration between alternative cursor control and scroll bar control functions responsive to the detection independent of a sliding movement of said number of fingers;
    in the scroll bar control function, detecting the sliding movement of said number of fingers on the touchpad for scrolling on a window in accordance with the finger movement, selectively setting a scroll direction based on comparative vertical and horizontal distances of the finger movement; and
    continuing said scroll bar control function to scroll in further distance-based response to at least one finger remaining continuously on said touchpad when said number of fingers remaining continuously on said touchpad is greater than a second threshold;
    wherein said first threshold is larger than one and said second threshold.

2. The method according to claim 1, wherein the first threshold is two.

3. The method according to claim 1, further comprising terminating the scroll bar control function once the number of fingers touching on the touchpad are equal to or less than a second threshold.

4. The method according to claim 3, wherein the second threshold is zero.

5. The method according to claim 1, further comprising evaluating a vertical distance and a horizontal distance of the movement for scrolling a vertical scroll bar, a horizontal scroll bar, or a combined vertical and horizontal scroll bar on the window, respectively.

6. A method for scroll bar control on a touchpad comprising the steps of:
    detecting if a number of fingers touching on a region of the touchpad is equal to or larger than a first threshold, for starting up a scroll bar control function;
    selectively redefining the touchpad in operational configuration between alternative cursor control and scroll bar control functions responsive to the detection independent of a sliding movement of said number of fingers;
    in the scroll bar control function, detecting the sliding movement of one or more fingers on the touchpad for scrolling on a window in accordance with the finger movement; and,
    selectively setting a scroll direction based on comparative vertical and horizontal distances of the movement for scrolling a vertical scroll bar on the window if the vertical distance is larger than the horizontal distance over a reference, or a horizontal scroll bar on the window if the horizontal distance is larger than the vertical distance over the reference; and
    continuing said scroll bar control function to scroll in further distance-based response to at least one finger remaining continuously on said touchpad when said number of fingers remaining continuously on said touchpad is greater than a second threshold;
    wherein said first threshold is larger than one and said second threshold.

7. The method according to claim 6, further comprising determining a scrolling amount for the vertical scroll bar in proportion to a difference between the vertical distance and the horizontal distance.

8. The method according to claim 6, further comprising determining a scrolling amount for the vertical scroll bar in proportion to the vertical distance.

9. The method according to claim 6, further comprising determining a scrolling amount for the horizontal scroll bar in proportion to a difference between the horizontal distance and the vertical distance.

10. The method according to claim 6, further comprising determining a scrolling amount for the horizontal scroll bar in proportion to the horizontal distance.

11. A method for scrolling a window on a touchpad, comprising the steps of:
    detecting a number of fingers touching on the touchpad for starting up a scrolling window configuration and selectively reconfiguring the touchpad between a cursor control window configuration and the scrolling window configuration responsive to the number of fingers meeting a first threshold independent of a sliding movement of said number of fingers;
    in the scrolling window configuration, selectively setting a scroll direction based on comparative evaluation of vertical and horizontal distances of a continuous movement of one or more fingers sliding on the touchpad for a vertical scrolling, a horizontal scrolling, or a combined vertical and horizontal scrolling;
    continuing said scrolling in the scrolling window configuration in further distance-based response to at least one finger remaining continuously on said touchpad; and
    transmitting a scrolling amount to a host system a selected one of the vertical, horizontal, or combined vertical and horizontal scrolling directions;
    wherein said first threshold is larger than one.

12. The method according to claim 11, wherein the first threshold is two.

13. The method according to claim 11, further comprising continuing the scrolling window configuration responsive to the number of fingers touching on the touchpad is greater than a second threshold;
    wherein said first threshold is larger than said second threshold.

14. The method according to claim 13, wherein the second threshold is one.

15. The method according to claim 11, further comprising terminating the scrolling window configuration once the number of fingers touching on the touchpad are equal to or less than a second threshold;
    wherein said first threshold is larger than said second threshold.

16. The method according to claim 15, wherein the second threshold is zero.

17. The method according to claim 11, wherein a vertical scrolling amount for scrolling the window in the vertical direction is proportional to the vertical distance of continuous finger movement.

18. The method according to claim 17, wherein a horizontal scrolling amount for scrolling the window in the horizontal direction is proportional to the horizontal distance of continuous finger movement.

* * * * *